Oct. 7, 1969  W. H. KNAPP ET AL  3,470,881
ACCESSIBLE CONCAVE
Filed Oct. 20, 1966  2 Sheets-Sheet 1
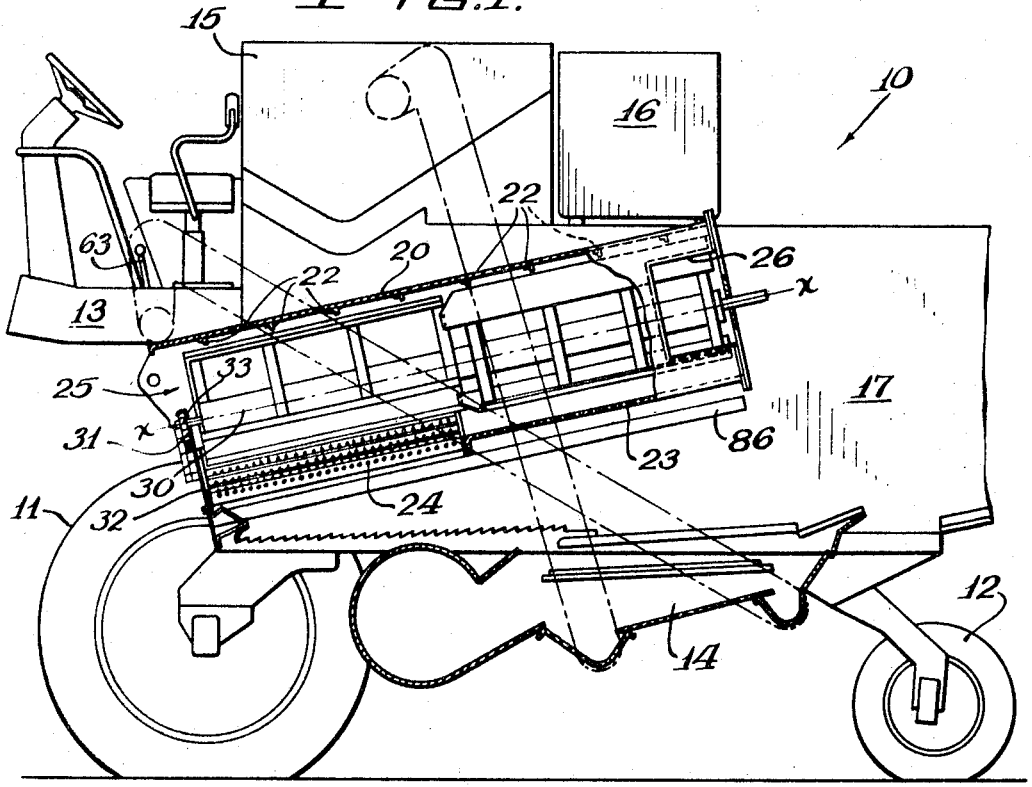
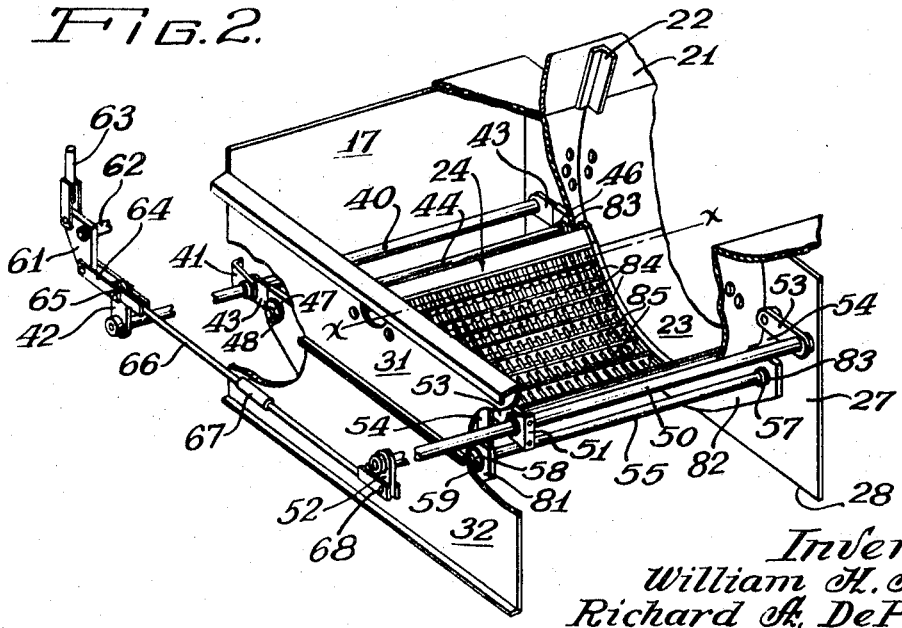
Inventors:
William H. Knapp
Richard A. DePauw
By

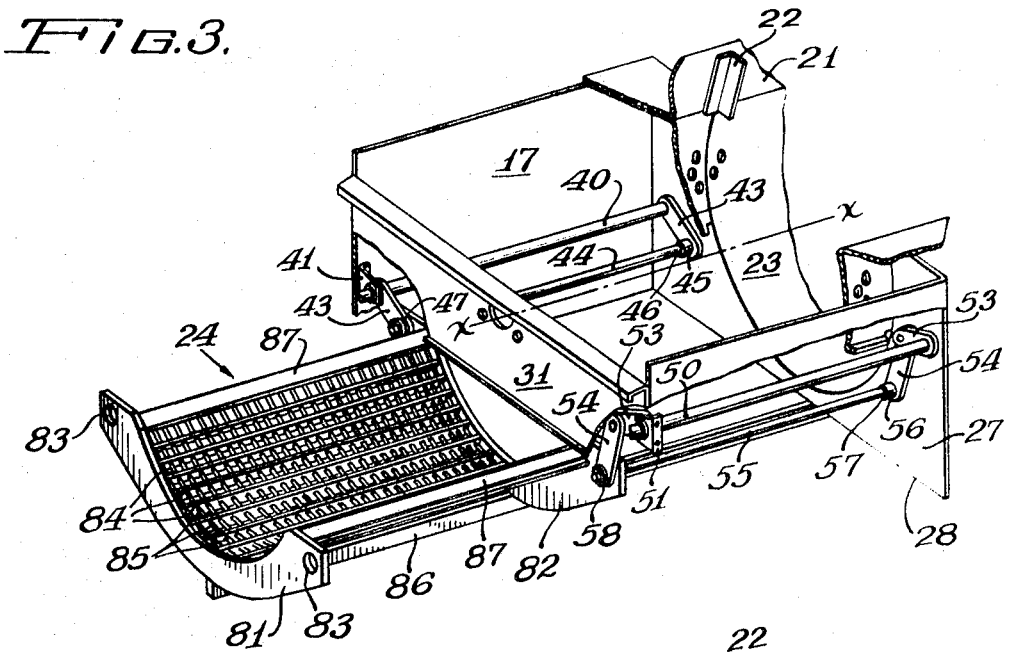
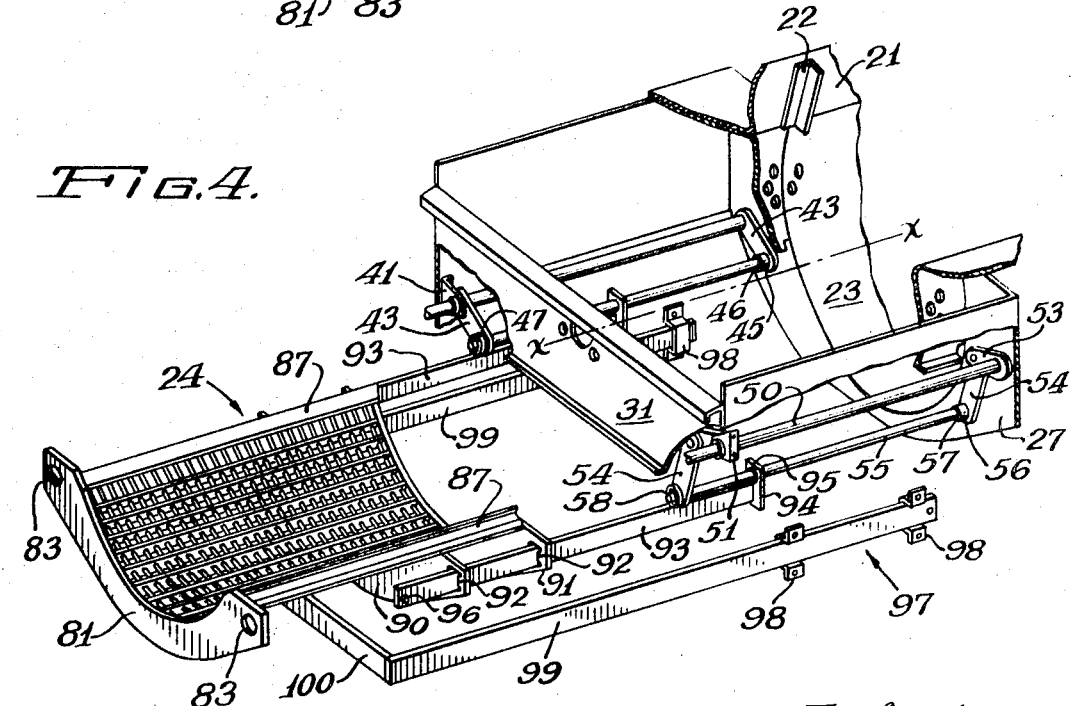

United States Patent Office 3,470,881
Patented Oct. 7, 1969

3,470,881
ACCESSIBLE CONCAVE
William H. Knapp, Davenport, Iowa, and Richard A. De Pauw, East Moline, Ill., assignors to International Harvester Company, Chicago, Ill., a corporation of Delaware
Filed Oct. 20, 1966, Ser. No. 588,191
Int. Cl. A01f 12/20, 12/28
U.S. Cl. 130—27
9 Claims

ABSTRACT OF THE DISCLOSURE

A mounting and support apparatus for the concave of an axial flow combine that will permit vertical adjustment of the concave and also permit the concave to be supported in a maintenance position exteriorly of the combine housing. The concave slides longitudinally of the combine in a forward direction to a position where it is accessible for maintenance while still supported by the combine.

---

The present invention relates generally to improvements in combines and the like and more particularly to a new and improved rotary or axial flow type combine in which the adjustable concave can be shifted to a maintenance position externally of the combine housing.

In all present commercially available combines the material to be threshed is fed between a rotary cylinder and a stationary concave in a direction normal to the axis of the rotating cylinder. Much of the grain contained in the material fed to the cylinder and concave passes through the concave as threshed grain. The remainder of the material is conveyed to the separating components of the combine which in conventional combines includes reciprocating or oscillating straw racks, return pans, and chaffer sieves. The subject invention concerns a combine that operates on a completely different principle than the above described commercially available combines. In the combine described in the subject application an elongated rotor is provided along the longitudinal axis of the combine. The elongated rotor is enclosed within a cylinder having transport fins provided along its internal upper sorface and a concave and grate provided along its lower surface. The material to be threshed is fed into the front end of the cylinder and is metered axially toward the rear while being processed by the cooperating elements on the rotor and cylinder. An axial flow type combine such as this has the obvious advantage over conventional combines in the simplicity of its drive since it utilizes only simple rotary drives and does not include oscillating or reciprocating elements. This not only simplifies the drive for the separating section but also reduces vibrations considerably. Furthermore, the elements of an axial flow type separating section have better structural stability than those of conventional separating sections and are thus more durable and reliable. In axial flow combines the threshing and separating are both performed within the cylinder through the action of the rotor. Conventional rasp bars are mounted axially along the front section of the rotor where the threshing function is performed. In so constructing the threshing and separating section of the combine there is only one moving part in these sections, the rotor. The drive for rotating the rotor is obviously much simpler than the several drives required in the threshing and separating sections of conventional combines. A more complete disclosure of axial flow combines of the type described above can be found in the copending U.S. patent application of Rowland-Hill et al., Ser. No. 576,151, filed on Aug. 30, 1966.

The general purpose of this invention is to provide an improvement in the combines disclosed in the above referred to applications. This improvement concerns the provision of an adjustable concave that can be moved from its operative position within the combine housing to a maintenance position exteriorly of the combine housing. The concave is supported on the combine by mounting and support means that will enable it when in the operative position to be raised and lowered with respect to the rotor and to easily slid forward to a maintenance position while still carried by the mounting and support means.

The surface of the concave is made up of apertured bars with wires extending through the apertures. In different crops and different crop conditions it is desirable to have a particular character of concave surface to control how much of the particular crop will pass through and how much will be held on the surface of the concave. The classification characteristic of the concave is controlled by increasing or decreasing the number of wires in the surface or by arranging the wires in selected patterns. When inserting new wires in the concave surface they are straight and must be curved by the installer as he works them through the bars. This job is tedious and time-consuming, particularly when the concave is not readily accessible. As a result an operator will often operate his combine without changing the wire pattern realizing that a different wire pattern would have been more effective by utilizing applicants' invention the operator will be encouraged to change the pattern whenever the conditions indicate a change is desirable. With applicants' invention the heavy steel concave can be serviced and the wire pattern changed without lifting or completely removing the concave from the combine housing. Servicing of the concave can be performed by one person in a minimum of time without the use of any special tools.

An object of the present invention is the provision of an adjustable concave for an axial flow type combine that can be shifted to a maintenance position externally of the combine housing.

Another object is to provide mounting and support means on an axial flow type combine that will support the concave in either the operative position or a maintenance position externally of the combine housing.

A further object of the invention is the provision of mounting and support means that will enable the entire concave to be supported in a maintenance position externally of the combine housing.

Still another object is to provide mounting and support means for the concave of an axially flow type combine including a support bar extending rearwardly of said concave that will engage a portion of the combine housing to support the concave in the maintenance position.

Yet another object of the present invention is the provision of mounting and supporting means for an adjustable concave that can be shifted into a maintenance position including a carriage assembly that can be independently shifted into a position beneath the concave when it is in the maintenance position to add support therefor.

These and other objects of the invention will become more apparent from the specification and drawings, wherein:

FIGURE 1 shows a side view of the axially flow type combine having portions broken away for clarity;

FIGURE 2 is a pictorial view of one embodiment of the adjustable concave in the operaitve position;

FIGURE 3 is a pictorial view of the adjustable concave of FIGURE 2 in the maintenance position; and FIGURE 4 is a pictorial view of a second embodiment of the adjustable concave in the maintenance position.

Referring now to the drawings wherein like reference characters designate like or corresponding parts throughout the several views there is shown in FIGURE 1 an axial flow combine generally designated 10 having a housing including side walls 17. The combine 10 includes conventional elements such as drive wheels 11, steerable wheels 12, an operators' platform 13, a cleaning system 14, a grain tank 15 and an engine 16.

The threshing and separating sections of the combine 10 are confined within an axial cylinder 20 that is arranged generally along the longitudinal axis, designated *x—x*, of the combine 10. The axial cylinder 20 includes a top section 21 having sections of spiral flighting 22 depending from the internal surface thereof. The lower rear portion of the axial cylinder 20 is made up of a grate section 23 and the forward lower portion of the cylinder is defined by the concave 24. As can be seen in FIGURE 1 the cylinder 20 has a material inlet opening 25 and a straw discharge opening 26.

The axial cylinder 20 is enclosed within the combine housing and is rigidly connected to the side walls 17 of the housing as indicated in FIGURES 2–4 by supports such as the bulkhead or support member 27 and the bearing mount plate 31. The bulkhead or support member 27 has a downwardly facing bearing surface 28 that serves a purpose to be more fully discussed.

The rotor bearing 33 is carried on the bearing mount plate 31 and functions to rotatably mount one end of the rotor 30. A removable access plate 32 is connetced to the housing below the bearing mount plate 31.

Referring now to FIGURES 2 and 3, the mounting and support means for the concave 24 will be discussed. A first pivot shaft 40 is pivotally mounted at its front end by a mounting bracket 41 that in turn is carried by the side wall 17 and at its rear end by the bulkhead or support member 27. The first pivot shaft 40 extends through an opening along the edge of the access plate 32. A first arm 42 is rigidly connected to the forward free-end of the first pivot shaft 40. A pair of second arms 43 are rigidly connected to shaft 40 and extend outwardly therefrom in parallel relationship. A rod 44 is secured to and connects the free ends of arms 43 and carries a support bushing 45 of a larger diameter adjacent its connection with the rearmost arm 43. A beveled portion 46 on support bushing 45 provides a smooth transition between the rod 44 and the bearing surface of the support bushing 45. Another support bushing 47 is carried by the front face of the forward arm 43. Rod 44 extends through the forward arm 43 and the support bushing 47 and terminates in a free end portion having a hole formed therein to receive a cotter pin 48.

A second pivot shaft 50 is pivotally supported on the combine housing by a mounting bracket 51 and the bulkhead or support member 27. The second pivot shaft 50 extends forwardly through an opening formed in the bearing mount plate 31 terminating in a free-end-portion. A first arm 52 is rigidly connected to the free-end-portion of the second pivot shaft extending downwardly therefrom. A pair of second arms 53 are rigidly secured to the second pivot shaft 50 and terminate in free-end-portions. Links 54 are pivotally connected to the free-end-portion of each of the arms 53 and a rod 55 connects the links 54. A support bushing 56 of larger diameter than rod 55 is secured to the rod at its connection with the rearward link 54. A beveled portion 57 of support bushing 56 provides a smooth transition from the small diameter of the rod 55 to the large diameter of the support bushing 56. A support bushing 58 is carried by the front-face of the forward link 54. The rod 55 extends through the forward link 54 and the support bushing 58 and terminates in a free-end-portion. The free-end-portion of the rod 55 has a hole formed therein to receive a cotter pin 59.

When the concave is in the operative position it is supported at four points on the support bushings 45, 47, 56 and 58. By rotating the first and second pivot shafts 40 and 50 the concave 24 can be adjusted towards or away from the rotor 30. A control lever designated 63 can be manipulated by the operator from his platform 13 to adjust the concave. A bellcrank lever 61 is pivotally supported on the combine housing by a pivot means 62. The control lever 63 is pivotally connected to one arm of the bellcrank lever 61 as indicated in FIGURE 2. A link 64 is pivotally connected at one end to the other arm of bellcrank lever 61 and at its other end by a pivot pin 65 to the arm 42 carried by the first pivot shaft 40. A bar 66 is connected by the same pivot pin 65 to the arm 42. The other end of bar 66 is connected by pivot pin 68 to the arm 52 carried by the second pivot shaft 50. An adjusting means 67 is provided to adjust the overall length of bar 66 which controls the adjusting range of the concave.

The concave 24 as seen in FIGURES 2 and 3 has a frame consisting of a first rib 81, a second rib 82, a pair of edge bars 87 and a support bar 86. The support bar 86 extends rearwardly from the first rib 81 beyond the second rib 82 and continues for a distance in excess of that between ribs 81 and 82. The support bar 86 has an upwardly facing bearing surface that engages and slides against the downwardly facing bearing surface 28 of the bulkhead or support 27. The area defined by ribs 81, 82 and edge bars 87 is covered by the concave bars 84 and wires 85.

When the concave 24 is in the maintenance position as shown in FIGURE 3, the support bar 86 is exerting an upward force against the downwardly facing bearing surface 28.

Each of the ribs 81 and 82 is provided with a set of circular apertures designated 83. The set of apertured portions of first rib 81 can be best seen in FIGURE 3. The set of apertured portions of second rib 82 are in the same relative position on the rib and are identified in FIGURE 2. The shape and size of apertures 83 conform to the shape and size of the support bushings 45, 47, 56 and 58. When the concave 24 is in the operative position as shown in FIGURE 2, the support bushings 45, 47, 56 and 58 are positioned within the apertures 83 and the cotter pins 48 and 59 are inserted to hold the concave in the operative position.

When it is desired to shift the concave 24 from the operative position as shown in FIGURE 2, the access plate 32 and cotter pins 48 and 59 are removed. The concave is then pulled forward and is no longer supported on the support bushings 45, 47, 56 and 58. The first rib 81 is left hanging without any direct support. The second rib 82 slides down the beveled portions 46 and 56 and is then supported on the bars 44 and 55. The weight of the concave 24 would tend to pivot it downwardly as seen in FIGURE 3 about an axis connecting the apertures 83 of rib 82. However, this downward pivotal movement of the concave 24 is resisted by engagement of the support bar 86 against the downwardly facing bearing surface 28 of the bulkhead 27. The concave can be pulled forward to the position wherein it engages the forward arm 43 and the forward link 54. In this position the concave bars 84 and wires 85 can be replaced or repaired. The position of the concave as shown in FIGURE 3 is designated the maintenance position. After the necessary maintenance has been performed the concave 24 is returned to the operative position by merely sliding it rearwardly until the beveled portions 46 and 57 align the apertures 83 of rib 82 with the support bushings 45 and 56. The front end of the concave is aligned by the operator such that the support bushings 47 and 58 are inserted into the apertures 83 in rib 81. The cotter pins 48 and 59 are then inserted to hold the concave in the operative position and the access plate 32 is connected which serves to lock the concave in operative position.

Referring now to FIGURE 4 a second embodiment of concave frame will be described. In this embodiment the mounting and support means carried by the combine housing are identical to that described above. The same reference numerals have been used in FIGURE 4 to identify the elements that are common to both embodiments. In FIGURE 4 the concave 24 is shown in the maintenance position. As can be best appreciated by comparing FIGURES 3 and 4 the construction shown in FIGURE 4 permits the concave to assume a maintenance position that is further removed from the combine housing than is permitted by the embodiment of FIGURE 3. This embodiment renders the concave more accessible and even the rearmost wires 85 can be easily removed and replaced.

The cancave frame in addition to the first rib 81 includes second and third transverse ribs designated 90 and 91, respectively. The ribs 90 and 91 are located adjacent the rearmost portion of the concave 24. I-shaped openings are formed in the end portions of each of the ribs 90 and 91. The openings 92 are aligned such that they can receive a slide bar 93 having a cross section corresponding to the shape of the openings 92. Plates 94 are rigidly secured to rear free end of the slide bars 93 and extend upwardly from the bars 93. A circular aperture 95 is formed in the upper free-end-portion of each plate 94 and is shaped and dimensioned such that they receive the support bushings 45 and 56. Bars 93 are provided with an abutment 96 at their forward free end to limit the movement of concave 24 along the bars 93. Thus plates 94 are permitted to slide along rods 44 and 55 and the ribs 90 and 91 of the concave are permitted to slide along the slide bars 93.

To shift the concave 24 from the maintenance position as shown in FIGURE 4 to the operative position the operator pushes rearwardly on the concave causing it to slide along the slide bar 93. When the third rib 91 encounters the plates 94, the plates 94 will then slide along the rods 44 and 55 until the beveled portions are encountered which function to align the apertures 95 with their corresponding bushings 45 and 56. The apertures 83 formed in rib 81 are aligned by the operator with the support bushings 47 and 58. The cotter pins 48 and 59 are then inserted and access plate 32 is installed. It should be noted that the ribs 90 and 91 do not extend up as high as the rib 81 and thus can pass unencumbered beneath the support bushings 47, 58 and the rods 44 and 55.

A carriage assembly generally designated 97 is shown in FIGURE 4 that is in the form of an open shelf that can be pulled out independently of the concave to provide added support for the concave when it is in the maintenance position. The carriage assembly 97 is supported on the combine housing by brackets 98 that are carried by the side walls 17. The carriage 97 is made up of a generally U-shaped member comprising a pair of arms 99 connected at their forward free ends by a cross bar 100. The arms 99 are slidably supported in the brackets 98 and the cross bar 100 has an upwardly facing bearing surface that is adapted to underlie and engage the concave 24 when it is in the maintenance position. The cross bar 100 of the carriage assembly can be located at any desired position beneath the concave 24.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. An axial flow combine of the type including a housing having a cylinder arranged along its longitudinal axis, a rotor mounted for rotation with said cylinder wherein the invention comprises:
a concave forming in its operative position the forward lower portion of said cylinder;
mounting and support means for said concave that will permit the concave to be shifted from its operative position to a maintenance position forward of and exteriorly of said housing;
said mounting and support means includes a pair of rods supported by said housing parallel to its longitudinal axis, each rod carrying spaced support bushings;
said concave having a frame including sets of apertured portions dimensioned to slidingly receive said support bushings;
one of said sets of apertured portions adapted to slide along said rod and to support the concave thereon when shifting said concave from the operative position to the maintenance position.

2. The invention as set forth in claim 1 wherein said axial flow combine includes adjusting means for vertically adjusting the position of said rods relative to said housing to thereby change the clearance between said concave and said rotor.

3. An axial flow combine of the type including a housing having a cylinder arranged along its longitudinal axis, a rotor mounted for rotation with said cylinder wherein the invention comprises:
a concave and concave frame forming in its operative position the forward lower portion of said cylinder;
mounting and support means for said concave that will permit the concave to be shifted from its operative position to a maintenance position forward of and exteriorly of said housing;
said concave frame includes a support bar extending along said longitudinal axis rearwardly of said concave, said support bar including an upwardly facing bearing surface;
said housing having a support member located rearwardly of said concave with a downwardly facing bearing surface; and
the bearing surfaces of said support bar and said support member adapted to slide upon each other when the concave is shifted from the operative position to the maintenance position.

4. An axial flow combine of the type including a housing having a cylinder arranged along its longitudinal axis, a rotor mounted for rotation with said cylinder wherein the invention comprises:
a concave forming in its operative position the forward lower portion of said cylinder;
mounting and support means for said concave that will permit the concave to be shifted from its operative position to a maintenance position forward of and exteriorly of said housing;
a carriage assembly slidably mounted on said housing below said concave, said carriage assembly including a pair of spaced arms supported on said housing to permit longitudinal movement, a cross bar connecting the forward free ends of said pair of spaced arms, said cross bar having an upwardly facing bearing surface upon which the concave rests when the concave is in the maintenance position and the carriage assembly is extended.

5. The invention as set forth in claim 1 wherein said concave frame includes a pair of spaced transverse ribs adjacent the rear of said concave, openings formed in the ends of each transverse rib, said openings in adjacent transverse ribs being aligned longitudinally,
slide bars having front and rear ends and dimensioned to be slidably received within said openings, and plates secured to the rear ends of said slide bars and extending upwardly thereon,
said one of said sets of apertured portions being formed in said plates.

6. The invention as set forth in claim 1 wherein said axial flow combine includes adjusting means for vertically adjusting the position of said rods relative to said housing to thereby change the clearance between said concave and said rotor.

7. The invention as set forth in claim 1 wherein a carriage assembly is slidably mounted on said housing below said concave, said carriage assembly including a pair of spaced arms supported on said housing to permit longitudinal movement, a cross bar connecting the forward free ends of said pair of spaced arms, said cross bar having an upwardly facing bearing surface upon which the concave rests when the concave is in the maintenance position and the carriage assembly is extended.

8. The invention as set forth in claim 2 wherein a carriage assembly is slidably mounted on said housing below said concave, said carriage assembly including a pair of spaced arms supported on said housing to permit longitudinal movement, a cross bar connected to the forward free ends of said pair of spaced arms, said cross bar having an upwardly facing bearing surface upon which the concave rests when the concave is in the maintenance position and the carriage assembly is extended.

9. The invention as set forth in claim 2 wherein said concave frame includes a pair of spaced transverse ribs adjacent the rear of said concave, openings formed in the ends of each transverse rib, said openings in adjacent transverse ribs being aligned longitudinally, slide bars having front and rear ends and dimensioned such that they are adapted to be slidably received within said openings, and plates secured to the rear ends of said slide bars and extending upwardly therefrom, said one of said sets of apertured portions being formed in said plates.

References Cited
UNITED STATES PATENTS

| | | | |
|---|---|---|---|
| 1,824,632 | 9/1931 | Schlayer | 130—27.17 |
| 2,050,631 | 8/1936 | Schlayer | 130—27.17 |
| 2,743,728 | 5/1956 | Carlson | 130—27.9 |

ANTONIO F. GUIDA, Primary Examiner